United States Patent
Kalmbach et al.

(10) Patent No.: US 10,267,023 B2
(45) Date of Patent: Apr. 23, 2019

(54) SUPPORT DEVICE AND HAND-HELD SHOWER

(71) Applicant: Hansgrohe SE, Schiltach (DE)

(72) Inventors: Marc Kalmbach, Aichhalden (DE); David Zapf, Berghaupten (DE)

(73) Assignee: Hansgrohe SE, Schiltach (DE)

( * ) Notice: Subject to any disclaimer, the term of this patent is extended or adjusted under 35 U.S.C. 154(b) by 45 days.

(21) Appl. No.: 15/381,788

(22) Filed: Dec. 16, 2016

(65) Prior Publication Data

US 2017/0183848 A1 Jun. 29, 2017

(30) Foreign Application Priority Data

Dec. 23, 2015 (DE) .................. 10 2015 226 624

(51) Int. Cl.
*F16B 2/06* (2006.01)
*E03C 1/06* (2006.01)
*F16C 29/10* (2006.01)

(52) U.S. Cl.
CPC .............. *E03C 1/066* (2013.01); *F16C 29/10* (2013.01); *F16B 2/06* (2013.01)

(58) Field of Classification Search
CPC ....................................................... E03C 1/066
USPC ............................................................. 4/605
See application file for complete search history.

(56) References Cited

U.S. PATENT DOCUMENTS

| 4,174,822 A | 11/1979 | Larsson |
| 2011/0179566 A1 | 7/2011 | Yang |
| 2014/0064836 A1 | 3/2014 | Lin |

FOREIGN PATENT DOCUMENTS

| CN | 201588263 U | 9/2010 |
| CN | 102824132 A | 12/2012 |
| DE | 2342613 | 2/1975 |
| DE | 2342613 A1 | 2/1975 |
| DE | 2742112 A1 | 3/1978 |
| DE | 19827350 A1 | 12/1999 |
| DE | 19937042 A1 | 2/2001 |
| DE | 10303169 A1 | 7/2004 |
| DE | 102008052886 A1 | 5/2010 |
| EP | 0965699 A1 | 12/1999 |
| EP | 0965699 B1 | 9/2004 |
| JP | 07268920 A | 10/1995 |

OTHER PUBLICATIONS

Office Action (English translation) issued by the National Intellectual Property Administration, P.R. China, dated Sep. 6, 2018, for Chinese Patent Application No. 201611203746.8; 14 pgs.

*Primary Examiner* — Christine J Skubinna
(74) *Attorney, Agent, or Firm* — Faegre Baker Daniels LLP

(57) ABSTRACT

A support device useful for holding height-adjustable handheld showers and other devices includes a support slider (1), displaceable along a support bar (2), having a releasable clamping device (3) for fixing the support slider on the support bar. The clamping device (3) has two clamping jaws (8*a*, 8*b*) capable of being expanded elastically from a clamping position reducing the clamping gap to a sliding position increasing the clamping gap, which jaws encompass the support bar (2) at least partially, and define a clamping gap (7) between them. An operating unit (50), in an operative position, retains the clamping jaws in a clamping gap increasing sliding position, while the clamping jaws assume their clamping position in an initial position of the operating unit.

11 Claims, 4 Drawing Sheets

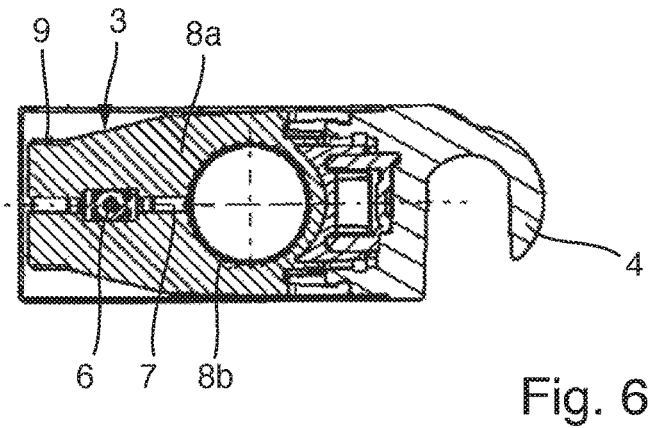
Fig. 6
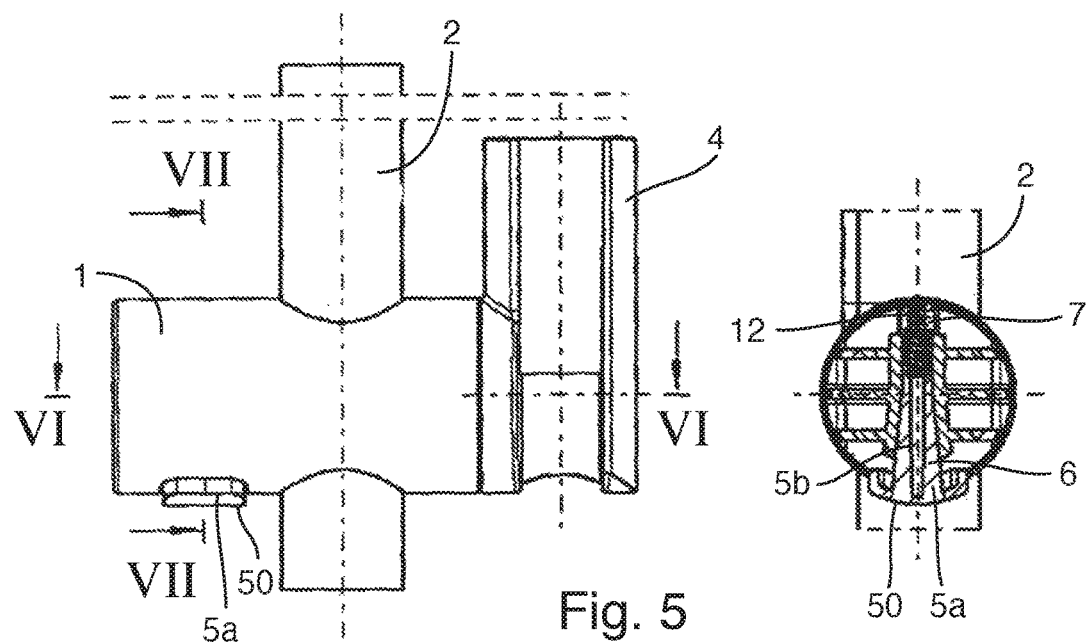
Fig. 5
Fig. 7

SUPPORT DEVICE AND HAND-HELD SHOWER

The invention relates to a support device comprising a support slider displaceable along a support bar, having a releasable clamping device for fixing the support slider on the support bar, and to a hand-held shower equipped with such support device.

Support devices of this type are used for holding a hand-held shower so as to be height-adjustable on a vertical wall bar of a shower cabin, for example.

A support device of this type in the form of a sliding piece having an installation for plug-fitting hand-held showers is known from patent publication DE 23 42 613 B2. The sliding piece is fixable to a wall bar and is adjustable in its height. Clamping pieces that are braceable in a spring-loaded manner between the sliding piece and the wall bar, and that by way of a respective activation flange project from the sliding piece at the top and the bottom, are disposed in a clearance of the sliding piece. An operator may cancel a clamping action of the sliding piece and displace the sliding piece by way of pressure to the activation flanges of the clamping piece.

The invention is based on the technical problem of providing a support device of the type mentioned at the outset in which the support slider may be fixed and repositioned in an advantageous manner.

The invention achieves this technical problem by providing a support device having the features mentioned at the outset, wherein the clamping device comprises two clamping jaws capable of being expanded elastically from a clamping position reducing a clamping gap to a sliding position increasing the clamping gap, which jaws encompass the support bar at least partially and define the clamping gap between them. The operating unit, in an operative position, retains the clamping jaws in the sliding position increasing the clamping gap, while the clamping jaws assume their clamping position in an initial position of the operating unit. Advantageous and preferred design embodiments of the invention are the subject matter of the further claims. The wording of the claims by way of explicit reference is hereby incorporated in the description.

In the case of the support device according to the invention, in the operative position of the operating unit activated by an operator, the clamping jaws of the clamping device are expanded and enable repositioning of the support device along the support bar. In the initial position of the operating unit the clamping jaws and thus the support slider are braced in relation to the support bar. To this end, the clamping jaws typically move in a jaws expanding direction or jaws clamping direction, respectively, in a manner diverging or converging that is substantially perpendicular to a support slider displacement direction.

In a design embodiment of the invention, the clamping device has an elastic element to bias the clamping jaws into their clamping gap reducing position. Alternatively, the clamping jaws may be embodied so as to be inherently elastic or resilient, respectively, this potentially rendering a separate elastic element obsolete.

In a further design embodiment of the invention, the elastic element includes a spring washer surrounding the clamping jaws. The spring washer may act on the clamping jaws of the clamping device and thus keep the support slide fixedly clamped to the support bar in the initial position of the operating unit. The spring washer may be embodied so as to be open or closed. On account thereof it advantageously results that the clamping effect of the support slider is given in the non-stressed initial position of the operating unit, such that any self-acting slippage that is unintended by the operator is prevented. Since the spring washer may be disposed on the clamping jaws so as to be spaced apart from the support bar, the clamping jaws may act as levers, increasing the contact pressure on the support bar. This leads to an increased clamping force or braking capability of the support device on the support bar.

In a design embodiment of the invention, the operating unit has a wedge element extending displaceably into the clamping gap. The wedge element may adjoin an operating head of the operating unit that is accessible to the operator, either as an integral component part of the operating head, or as an element that is adhesively bonded or welded or otherwise connected to said operating head; however, said wedge element may also be a separate component that is activated by way of the operating head. The wedge angle may be chosen such that no self-locking action is created, such that the wedge element upon completed activation of the operating head is returned to the initial position of the former by the clamping gap reducing spring force of the spring washer.

In a design embodiment of the invention, a direction of movement of the wedge element extends perpendicular to the jaws expanding direction. On account thereof, a wedge surface of the wedge element may be utilized for expanding the clamping jaws and for enabling repositioning of the support device.

In a corresponding implementation, the operating head herein may be disposed so as to be linearly displaceable by way of a direction of movement that is parallel with the direction of displacement of the wedge element. In this case, a common or in any case parallel line of action of the operating head and of the wedge element is given. This enables a particularly simple mode of construction, having relatively few components.

In another design embodiment of the invention, the operating head is disposed with a direction of movement non-parallel to the wedge element movement direction, and comprises a redirection element that changes the operating head movement direction toward the wedge element movement direction. By way of such an arrangement, a large freedom of design and a multiplicity of possibilities for positioning the operating head result.

The use of the wedge element enables a high expansion force which acts on the clamping jaws in the clamping gap increasing direction at a relatively minor activating force that has to be applied by the user.

In a further design embodiment of the invention the support device has an elastic restoring element exerting a restoring force on the wedge element, said force acting in a direction out of the clamping gap. This supports the return movement of the operating unit from the operative position thereof to the initial position thereof, and thus the return movement of the clamping device from the displacement position thereof to the clamping position thereof.

In another design embodiment of the invention, the operating unit comprises an eccentric rotational element, the eccentric motion of the latter acting on the clamping jaws. The operating unit herein may have for example an operating head having an eccentric rotational body that is integrally or otherwise connected in a rotationally fixed manner to said operating head. The operating unit in this case by a rotary movement by way of the eccentric rotational body that is disposed in the clamping gap of the clamping device may cause the clamping jaws to expand. In the initial position of the operating unit, a relatively narrow region of the rotational element that is not wider than the clamping gap in the clamping position is located in the clamping gap. In the operative position, a relatively wide region of the rotational element that is wider than the clamping gap in the clamping position and pushes the clamping gap apart is located in the clamping gap such that displacing of the support slider is unblocked. Switching between the two positions may be enabled by rotating the operating unit about a respective angle.

Advantageous embodiments of the invention are illustrated in the drawings and are described hereinbelow. In the drawings:

FIG. 5 shows a side view corresponding to FIG. 1, for a variant having a push button on the lower side and a restoring spring;

FIG. 6 shows a view in the longitudinal section along a line VI-VI of FIG. 5;

FIG. 7 shows a view in the cross section along a line VII-VII of FIG. 5;

Figure 1:
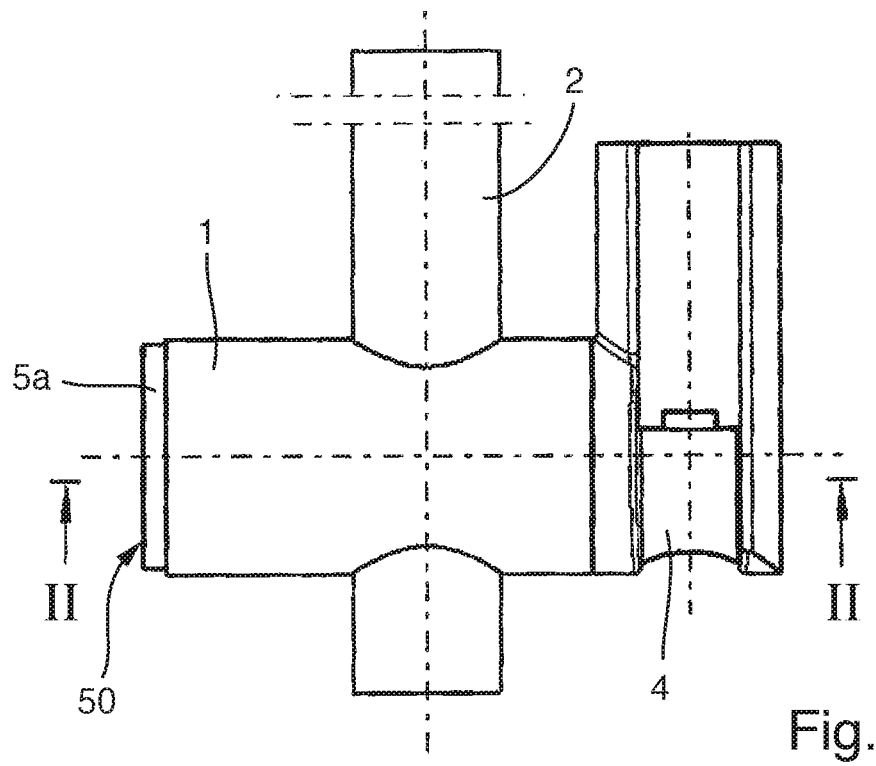
FIG. 1 shows a side view of a support device attached to support bar, having a wedge element and an end-side push button.
Figure 2:
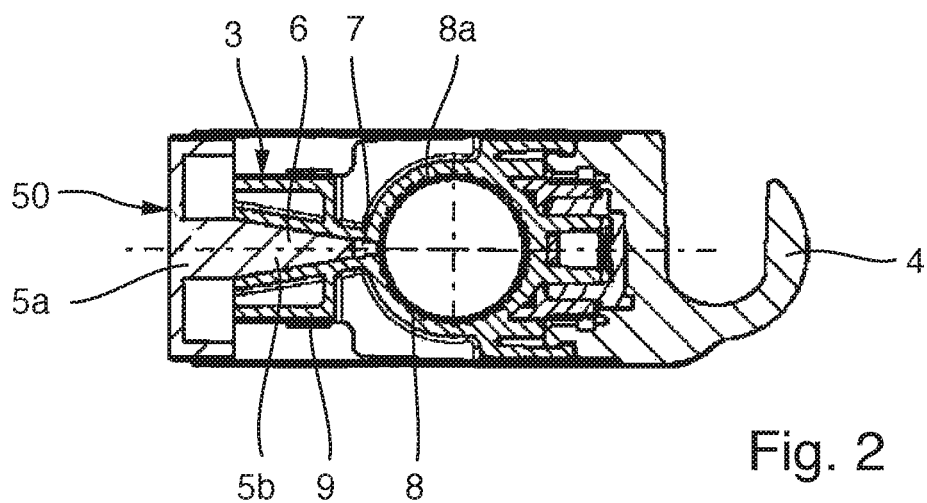
FIG. 2 shows a view in the longitudinal section along a line II-II of FIG. 1.

The support device shown in FIGS. 1 and 2 serves for holding a hand-held shower so as to be height adjustable on a support bar 2 such as a vertical wall bar of a shower installation. The support device has a support slider 1 having a releasable clamping device 3 for fixing the support slider 1 on the support bar 2, an operating unit 50 having an operating head 5a and a shower receptacle 4. As usual, the shower receptacle 4 serves for receiving the hand-held shower (not illustrated). The clamping device 3 is accommodated in a cylindrical housing of the support slider 1.

As can be seen in FIG. 2, the operating head herein is configured as a push button 5a which is integrally adjoined by a foot part 5b of the operating unit 50 which is formed on account thereof. The push button 5a is disposed so as to be movable on a side of the cylindrical support slider housing, along a longitudinal axis of the latter. The foot part 5b has a wedge element 6 extending so as to be displaceable along the longitudinal axis thereof into a clamping gap 7. The clamping device 3 has two clamping jaws 8a, 8b which at least partially encompass the support bar 2 and define the clamping gap 7 between them, and an elastic element 9 which biases the clamping jaws 8a, 8b into a clamping gap reducing clamping position.

The elastic element 9 is formed by a spring washer which surrounds the clamping jaws 8a, 8b. The spring washer, in a de-stressing position of the operating head 5a which corresponds to the clamping gap reducing clamping position of the clamping jaws 8a, 8b as shown in FIG. 2, causes the clamping jaws 8a, 8b to be pressed against the support bar 2 in a fixedly clamping manner. In an operative position in which the wedge element 6 widens the clamping gap 7, the clamping jaws 8a, 8b no longer bear on the support bar 2 in a clamping manner. Thus, the clamping device 3 together with the support device is displaceable in relation to the support bar 2.

The clamping jaws 8a, 8b each by way of one approximately semi-circular portion, define a passage opening for the support bar 2. The clamping jaws 8a, 8b are closed on one side of the semi-circular portions, being open on the other side while forming the clamping gap 7. On the closed side of the clamping jaws 8a, 8b the cylindrical support slider housing at the end side transitions into the shower receptacle 4, the operating unit 50 having the push button 5a being located on the housing end side that is opposite thereto. The clamping gap 7 and a longitudinal axis of the cylindrical support slider housing runs perpendicularly to a longitudinal axis of the support bar 2. The clamping jaws 8a, 8b on a radially external side each have one appendage that is configured as a hollow body, both jointly configuring a seat for the spring washer 9. An internal side of the clamping jaws 8a, 8b defines the clamping gap 7 as a wedge-shaped clearance that tapers off in the direction of the support bar 2. The foot part 5b, on a side that faces away from the operating head 5a, as the corresponding wedge element 6 has a double wedge that corresponds to the clearance.

In order for the support device to be repositioned along the support bar 2, an operator exerts pressure on the button-shaped operating head 5a. On account thereof, the operating unit 50 is repositioned in relation to the support slider housing in the direction of the support bar 2 into an operative position, and the wedge element 6 moves axially further along a longitudinal axis into the clamping gap 7 between the clamping jaws 8a, 8b, pressing the latter apart counter to the biasing spring force of the spring washer 9. A wedge element direction of movement thus runs perpendicularly to a jaw expanding direction. Consequently, the operating unit 50 in the operative position keeps clamping jaws 8a, 8b in a clamping gap increasing sliding position, counter to the bias of the elastic element 9 that acts in a radially inward manner. The clamping effect of the clamping device 3 is cancelled, and the support device may be displaced in height along the support bar 2. In the case of the operating head 5a being de-stressed, the clamping effect of the clamping device 3 is re-activated in that the spring washer 9 pushes the clamping jaws 8a, 8b toward one another so as to close such that the wedge element 7 is moved back and the clamping jaws 8a, 8b again fixedly clamp the support device on the support rod 2.

Further exemplary embodiments of the support device according to the invention are shown in FIGS. 3 to 9, wherein the points of difference of the exemplary embodiments in relation to that of FIGS. 1 and 2 will be chiefly discussed hereinbelow. For the sake of simplicity, parts with equivalent functions have identical reference signs, and to this extent reference may also be made to the description above relating to FIGS. 1 and 2.

Figure 3:
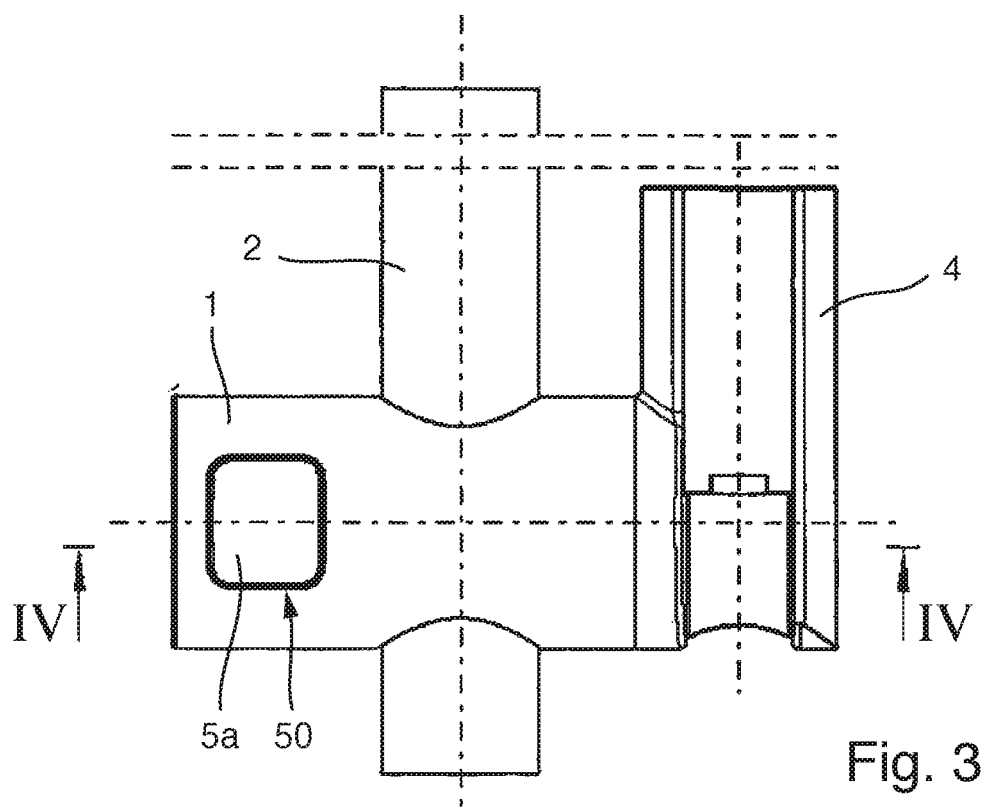
FIG. 3 shows a side view corresponding to FIG. 1, for a variant having a laterally disposed push button.

As opposed to the support device illustrated in FIGS. 1 and 2, the exemplary embodiment of FIG. 3 and additionally has a redirection element 10, and the push button is laterally disposed, that is to say on the side of the circumference, so as to be radially movable on the cylindrical support slider housing. Herein, an oblique surface of the foot part 5b of the operating unit 50 serves as the redirection element 10, and the wedge element 6 is embodied as a separate component, having an oblique surface that interacts with that of the foot part 5b. The clamping jaws 8a, 8b on the open side thereof have appendages which provide a guide surface for the operative movement of the operating unit 50, especially for the foot part 5b thereof. The spring washer 9 is located on that side of the operating unit 50 that faces away from the support bar 2, said spring washer 9 having a relatively large spacing from the latter, on account of which said spring washer 9 has a correspondingly large lever effect for pressing the clamping jaws 8a, 8b onto the support bar.

The operating head 5a and the redirection element 10 are integrally embodied, and the direction of movement thereof runs in a non-parallel, especially a perpendicular manner in the example shown, to the wedge element direction of movement and parallel to the clamp expansion direction. The foot part 5b on a side that faces the support bar 2 has a wedge-shaped taper. The wedge-shaped taper is contiguous to an oblique surface of the wedge element 6 that faces away from the support bar 2, the wedge element 6 on a side that faces the support bar having the double wedge which protrudes into the clamping gap 7. On a side of the foot part 5b that faces away from the support bar 2, the support slider housing has a counterbearing which supports the movement of the redirection wedge 10 and of the wedge element 6.

Upon activation of the operating head 5a in a manner perpendicular to a longitudinal axis of the support slider 1, downward in FIG. 3, the redirection element 10 which is integral thereto slides along the wedge surface of the wedge element 6 that faces away from the support bar 2, displacing the wedge element 6 in the direction of the support bar 2, that is to say to the right in FIG. 3. The direction of movement is thus redirected by approx. 90°. As has already been elaborated in the context of FIG. 1, the wedge element 6, on account thereof, acts in a clamping gap increasing manner on the clamping gap 7, and displacement of the support device in the vertical direction is enabled.

Figure 4:
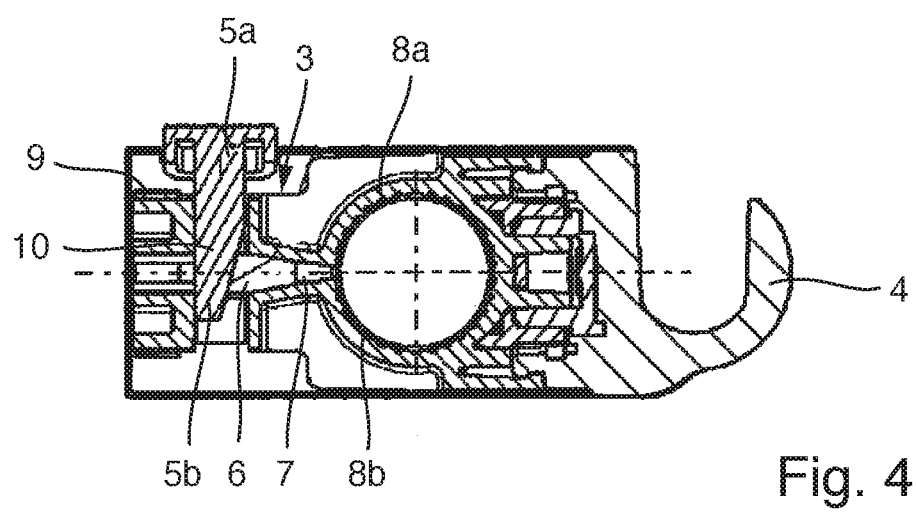
FIG. 4 shows a view in the longitudinal section along a line IV-IV of FIG. 3.

Upon de-stressing of the operating head 5a, the clamping jaws 8a, 8b by the bias of the elastic element are returned back to the clamping gap decreasing initial position of the former. Herein, the wedge element 6 in FIGS. 3 and 4 is pushed to the left and acts on the wedge-type taper of the redirection element 10, on account of which the latter in FIGS. 3 and 4 is displaced upward to the initial position thereof.

The exemplary embodiment of the support device illustrated in FIGS. 5 to 7, in relation to the exemplary embodiment shown in FIGS. 1 and 2, is modified to the extent that the operating head 5a, herein again in the form of a push button, is disposed on the lower side on the circumference of the cylindrical support slider housing so as to be radially movable on the latter, and the wedge element direction of movement accordingly runs parallel to the longitudinal axis of the support bar 2. Moreover, this exemplary embodiment has an elastic restoring element, herein in an exemplary manner in the form of a restoring spring 12 which is supported on the support slider housing and acts in a restoring manner, that is to say counter to the push-activation direction, on an end side of the wedge element 6 which is integral to the push button 5a. Herein, the wedge element 6 is disposed in the longitudinal direction of the housing, between the support bar 2 and the spring washer 9, that is to say that the spring washer 9 is located on that side of the wedge element 6 that faces away from the support bar 2.

When the operating head 5a is impinged with pressure by the operator, the wedge element 6 which is integrally molded to the operating head 5a is pushed into the clamping gap, pushing the clamping jaws 8a, 8b apart, and moreover compressing the restoring spring 12. The support device is thus repositionable along the support bar 2. If and when the operator de-stresses the operating head 5a, the wedge element 6 with additional support by the restoring spring 12 is returned to the initial position of the former, wherein the clamping jaws 8a, 8b, supported by the spring force of the spring washer 9, converge again, imparting the clamping effect thereof to the support bar 2.

Figure 8:
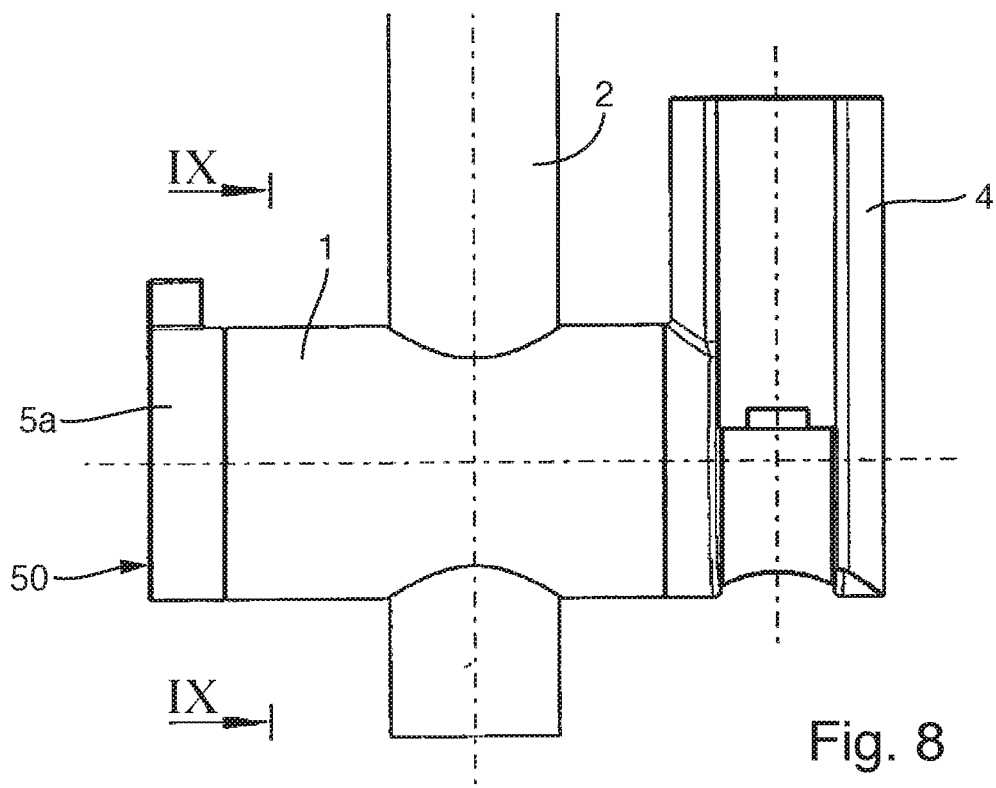
FIG. 8 shows a side view corresponding to FIG. 1, for a variant having an eccentric rotational element and a push button.
Figure 9:
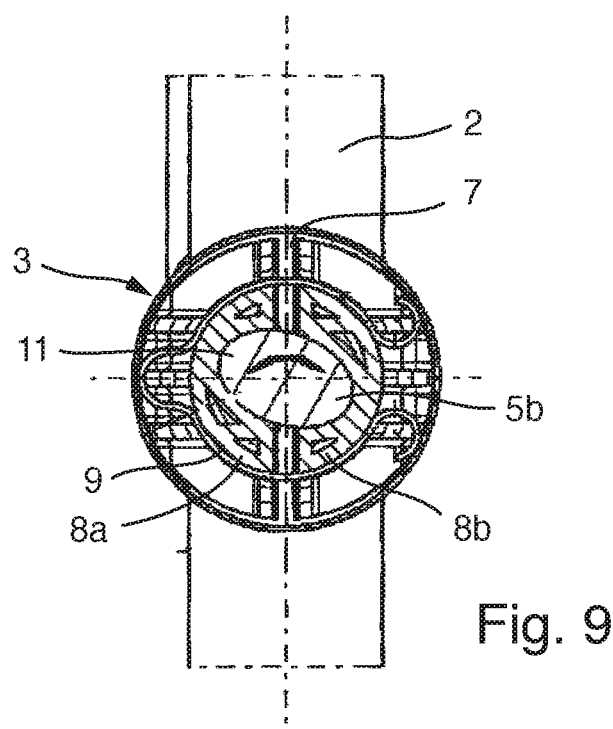
FIG. 9 shows a view in the cross section along a line IX-IX of FIG. 8.

The exemplary embodiment of the support device that is shown in FIGS. 8 and 9, in relation to the exemplary embodiments of FIGS. 1 to 7, is modified in that the operating unit 50 has an eccentric rotational element 11, the eccentric motion of the latter acting on the clamping jaws 8a, 8b which in turn are inwardly biased by the elastic element 9 which is embodied as an open spring washer. The eccentric rotational element 11 is connected in a rotationally fixed manner to the operating head 5a that in this embodiment is disposed so as to be rotationally movable on the housing end side, representing the foot part 5b of said operating head 5a, wherein the rotation axis of said eccentric rotary element 11 is parallel to the housing longitudinal axis. The eccentric rotational element 11 is disposed in the clamping gap 7, and the rotational axis of the former runs perpendicularly to the jaws expanding direction and perpendicularly to the support bar longitudinal axis. The clamping jaws 8a, 8b in a region of the clamping gap 7 have an oval clearance. The eccentric rotational element 11 that in a manner corresponding to the clearance is designed so as to be oval is disposed in the oval clearance.

In the clamping position, a relatively small, narrowest external diameter of the eccentric rotational element 11 bears on a relatively small, narrowest internal diameter of the clearance of the clamping jaws 8a, 8b. The elastic element 9 keeps the clamping jaws 8a, 8b in the clamping gap decreasing position, and the support device is fixed to the support bar 2.

Thus, if the operating head 5a that in this example is implemented as a rotary button is rotated about the rotation axis thereof from the initial position to the operative position, the clamping gap 7, counter to the spring force of the spring washer 9, is pushed apart by a relatively wide region of the eccentric rotational element 11 that is wider than the narrowest point of the oval clearance in the clamping jaws 8a, 8b. The clamping effect of the clamping device 3 is cancelled, and the clamping device thus becomes repositionable along the support bar 2. After repositioning of the support device, the operating head 5a is rotated further from the operative position to the clamping position, or is rotated back, on account of which the support device again assumes the clamping position thereof on the support bar 2.

In the exemplary embodiments shown, the elastic element includes a radially acting compressive spring washer. Alternatively, the elastic element may have an extension spring that acts between the clamping jaws. Furthermore alternatively, the elastic element may have a compression spring that acts on the side of the clamping jaws that faces away from the clamping gap, for example a leg spring. Furthermore, the clamping jaws per se may have an elastic material and, on account thereof, may be embodied so as to be inherently elastic such that a separate elastic element is potentially not required.

In alternative embodiments of the invention it is likewise possible for the support device to have an eccentric rotational element, the rotation axis of which runs parallel to the jaws expanding direction, wherein a wedge element which acts in a manner analogous to that of the examples of FIGS. 1 to 7 in the clamping gap of the clamping device is activated by the eccentric rotational element, expanding the clamping jaws.

As is demonstrated by the exemplary embodiments explained above, the invention provides an advantageous support device which may be adjusted for height with minimum effort or hand movements, respectively. In order for the height adjustment of the support device according to the invention to be released, only a pressing or rotating movement is required that may also be readily carried out with slippery hands, or by only a finger of a hand, respectively. Herein, in each case only one operating element is to be pushed or rotated, this substantially contributing toward the comfort of the handling since there is not a plurality of movement sequences that have to be coordinated.

The invention claimed is:

1. A support device, comprising:
   a support slider, displaceable along a support bar, having a releasable clamping device for fixing the support slider on the support bar, and
   an operating unit, wherein the clamping device comprises two clamping jaws, and a clamping gap defined between the clamping jaws, the clamping jaws capable of being expanded elastically from a clamping position reducing the clamping gap to a sliding position increasing the clamping gap, which jaws encompass the support bar at least partially, and
   the operating unit, in an operative position, retains the clamping jaws in the clamping gap increasing sliding position, while the clamping jaws assume their clamping position in an initial position of the operating unit,
   wherein the operating unit includes a wedge element extending displaceably along a longitudinal axis into the clamping gap.

2. The support device according to claim 1, wherein the clamping device includes an elastic element to bias the clamping jaws into a clamping gap reducing clamping position.

3. The support device according to claim 2, wherein the elastic element includes a spring washer surrounding the clamping jaws.

4. The support device according to claim 1, wherein a direction of movement of the wedge element extends perpendicular to a direction of jaw expansion.

5. The support device according to claim 4, wherein the operating unit includes an operating head, with a direction of movement non-parallel to the wedge element movement direction, and a redirection element to change the operating head movement direction towards the wedge element movement direction.

6. The support device according to claim 1, further comprising an elastic restoring element exerting a restoring force on the wedge element, said force acting in a direction out of the clamping gap.

7. A support device, comprising:
   a support slider, displaceable along a support bar, having a releasable clamping device for fixing the support slider on the support bar,
   an operating unit, wherein the clamping device comprises two clamping jaws, and a clamping gap defined between the clamping jaws, the clamping jaws capable of being expanded elastically from a clamping position reducing the clamping gap to a sliding position increasing the clamping gap, which jaws encompass the support bar at least partially,
   the operating unit, in an operative position, retains the clamping jaws in the clamping gap increasing sliding position, while the clamping jaws assume their clamping position in an initial position of the operating unit,
   wherein the clamping device includes an elastic element to bias the clamping jaws into a clamping gap reducing clamping position,
   wherein the elastic element includes a spring washer surrounding the clamping jaws, and
   wherein the operating unit includes a wedge element extending displaceably into the clamping gap.

8. The support device according to claim 7, wherein a direction of movement of the wedge element extends perpendicular to a direction of jaw expansion.

9. The support device according to claim 8, wherein the operating unit includes an operating head, with a direction of movement non-parallel to the wedge element movement direction, and a redirection element to change the operating head movement direction towards the wedge element movement direction.

10. The support device according to claim 7, further comprising an elastic restoring element exerting a restoring force on the wedge element, said force acting in a direction out of the clamping gap.

11. A hand-held shower with a support device, said support device comprising:
    a support slider, displaceable along a support bar, having a releasable clamping device for fixing the support slider on the support bar, and
    an operating unit,
    wherein the clamping device comprises two clamping jaws, and a clamping gap defined between the clamping jaws, the clamping jaws capable of being expanded elastically from a clamping position reducing the clamping gap to a sliding position increasing the clamping gap, which jaws encompass the support bar at least partially, and
    wherein the operating unit includes a wedge element extending displaceably along a longitudinal axis into the clamping gap,
    the operating unit, in an operative position, retains the clamping jaws in the clamping gap increasing sliding position, while the clamping jaws assume their clamping position in an initial position of the operating unit.

* * * * *